United States Patent [19]
Nagy et al.

[11] Patent Number: 4,866,453
[45] Date of Patent: Sep. 12, 1989

[54] VEHICLE SLOT ANTENNA WITH PARASITIC SLOT

[75] Inventors: Louis L. Nagy, Warren; Jimmy L. Funke, Mt. Clemens, both of Mich.

[73] Assignee: General Motors Corporation, Detroit, Mich.

[21] Appl. No.: 308,234

[22] Filed: Feb. 9, 1989

Related U.S. Application Data

[63] Continuation-in-part of Ser. No. 232,257, Aug. 15, 1988, abandoned.

[51] Int. Cl.⁴ .............................................. H01Q 1/32
[52] U.S. Cl. .................................. 343/712; 343/713; 343/717; 343/767
[58] Field of Search ............... 343/712, 711, 713, 717, 343/741, 767, 769, 833, 834

[56] References Cited

U.S. PATENT DOCUMENTS

| | | | |
|---|---|---|---|
| 2,575,471 | 11/1951 | Schweiss et al. | 343/712 |
| 2,859,411 | 11/1958 | Rosenbaum | 343/712 |
| 2,957,172 | 10/1960 | Howell et al. | 343/767 |
| 3,611,388 | 10/1971 | Okumura | 343/712 |
| 4,707,700 | 11/1987 | Nagy | 343/712 |
| 4,721,963 | 1/1988 | Nagy et al. | 343/713 |
| 4,737,795 | 4/1988 | Nagy et al. | 343/71 |
| 4,769,655 | 9/1988 | Nagy et al. | 343/713 |

FOREIGN PATENT DOCUMENTS 1546571 5/1979 United Kingdom .

Primary Examiner—Rolf Hille
Assistant Examiner—Hoanganh Le
Attorney, Agent, or Firm—Robert M. Sigler

[57] ABSTRACT

A slot antenna is disclosed for a horizontal dielectric vehicle door in which the ground plane of the antenna sheet does not connect with or overlap the surrounding electrically conducting vehicle body panels but which nevertheless maintains significant RF currents at FM frequencies through the vertical roof pillars of the vehicle. This is accomplished by the formation of a parasitic slot surrounding the antenna slot in the gap between the sheet and the surrounding sheet metal at the trunk opening. The parasitic slot has a first portion of length substantially the same as that of the antenna slot and a similar width and a second portion of a greater width effective to comprise an open circuit for currents. Thus the total effective length of the parasitic slot is equal to that of the antenna slot for similar resulting current flow from the decklid area through the vertical roof pillars; and the desirable FM performance is preserved. If the second portion of the parasitic slot is placed on a vertical portion of the door, backward horizontal radiation is also improved; and interference due to operation of an electric latching mechanism for the door is reduced if it is mounted in the second portion of the parasitic antenna.

8 Claims, 1 Drawing Sheet

VEHICLE SLOT ANTENNA WITH PARASITIC SLOT

BACKGROUND OF THE INVENTION

This is a continuation-in-part of U.S.Ser. No. 232,257, filed Aug. 15, 1988, now abandoned, and assigned to the This invention relates to a slot antenna for an openable door on a vehicle horizontal surface such as a decklid or hood and in particular to such an antenna providing acceptable vertically polarized radiation characteristics in a predetermined frequency band such as the commercial FM broadcasting band.

A slot antenna for a motor vehicle results from a looped dielectric slot a horizontal, electrically conducting plane, where the slot has a width of about one quarter inch and a total circumferential length of about one wavelength in the commercial FM broadcasting band of about 3.25 meters. The slot is typically fed at a single point at the front or the side and may be formed in a sheet of conducting material such as a flexible foil sheet attached to the underside of an electrically non-conducting dielectric roof, hood or decklid or in a painted, electrically conducting sheet coating on the underside of one of the same members.

For optimum FM performance of a vehicle slot antenna, it has been found desirable to maximize radio frequency ground currents current flowing in the outer skin of the vehicle. For a roof mounted antenna, the ground currents will flow from the roof area to the lower outer skin panels by means of the roof pillars. For a decklid mounted slot, the ground currents will flow from the decklid area to the lower panels and up the roof pillars to the roof area. The excitement of these vertical roof pillars with RF currents is particularly important in generating acceptable vertically polarized FM radiation characteristics for these vehicle antennas to match the vertically polarized portions of commercial FM broadcast signals. Such vertically polarized components aid in improving reception in a zone of high multi-path interference such as built-up urban areas. Maximum RF current flow at commercial FM frequencies through the roof pillars is thus of prime importance in the design of vehicles with slot antennas.

In the case of a slot antenna formed on a horizontal openable door such as a vehicle decklid or hood it is desirable to ensure that the portion of the ground plane of the antenna on the openable door, which is the conducting area of the openable door outside the slot, is electrically coupled to the surrounding sheet metal of the vehicle body around a substantial portion of the slot for adequate grounding at commercial FM frequencies. Two techniques have been developed for this FM grounding. The first uses physical contact between the ground plane of the antenna sheet and the vehicle body panels substantially all the way around the periphery of the door. This technique is not practical for decklid doors or hoods, which must be openable as a door and may be insulated around the periphery from the surrounding body panels by a rubber sealing gasket when closed.

The other technique is a substantial overlap, with a dielectric separation of about 5 mils, of the periphery of the openable door supported antenna ground plane over the surrounding body panels completely around the slot. This is shown in FIG. 2a for a decklid, wherein the sheet metal extension 10 of the horizontal body panel 11 extends inwardly under the foil or painted conducting metal sheet 12 on the undersurface of a nonconducting fiberglass decklid panel 13. However, there may be instances, as shown in FIG. 2b, wherein the conducting metal sheet 22 of the antenna ground plane does not extend over extension 20 of body panel 21 In these instances, an alternative to the prior art method of FM grounding must be found to preserve desirable antenna characteristics.

SUMMARY OF THE INVENTION

This invention is a slot antenna for a horizontal dielectric vehicle door such as a decklid in which a looped antenna slot, with a loop length equal to a wavelength in a predetermined frequency band, is formed in an electrically conducting sheet attached to the door but the sheet is not in direct electrical contact with or overlapping the surrounding electrically conducting vehicle body panels In order to couple the antenna slot ground plane in the sheet to the electrically conducting vehicle body, a parasitic slot is formed outside the antenna slot by the gap between the sheet and the electrically conducting vehicle body. The parasitic slot has a first continuous portion with a length substantially the same as the total loop length of the antenna slot and a similar width effective to couple the ground plane of the antenna slot across the gap and a second portion having a greater width effective to present an open circuit impedance to electric currents in the predetermined frequency range.

Thus, ground currents are generated parasitically in the electrically conducting vehicle body to enhance antenna performance. The first portion of the parasitic slot it placed closest to the vehicle roof; and the second portion is placed at the vehicle end opposite the roof across the antenna slot. Since the parasitic slot generally follows the door periphery, the ground currents outside the parasitic slot are generated near the side of the vehicle horizontal surface and are naturally directed toward the vehicle vertical roof pillars. Thus a substantial portion of these ground currents flow through the vehicle's vertical roof pillars to improve the antenna's vertically polarized radiation characteristics. This is particularly helpful in commercial FM reception, since the commercial FM signals include substantial vertically polarized components.

The door on which the sheet is attached, although generally horizontal, may have a small vertical portion at the end of the vehicle in which the second portion of the parasitic slot is located. This will additionally improve horizontal antenna radiation characteristics from the end of the vehicle. The vehicle may further have an electrically operated latching mechanism for the door located on the vertical part thereof within the second portion of the parasitic slot; and this will reduce electrical interference with antenna performance during operation of the latching mechanism. Further details and advantages of this invention will be apparent from the accompanying drawings and following description of a preferred embodiment.

DESCRIPTION OF THE EMBODIMENT

Figure 1:
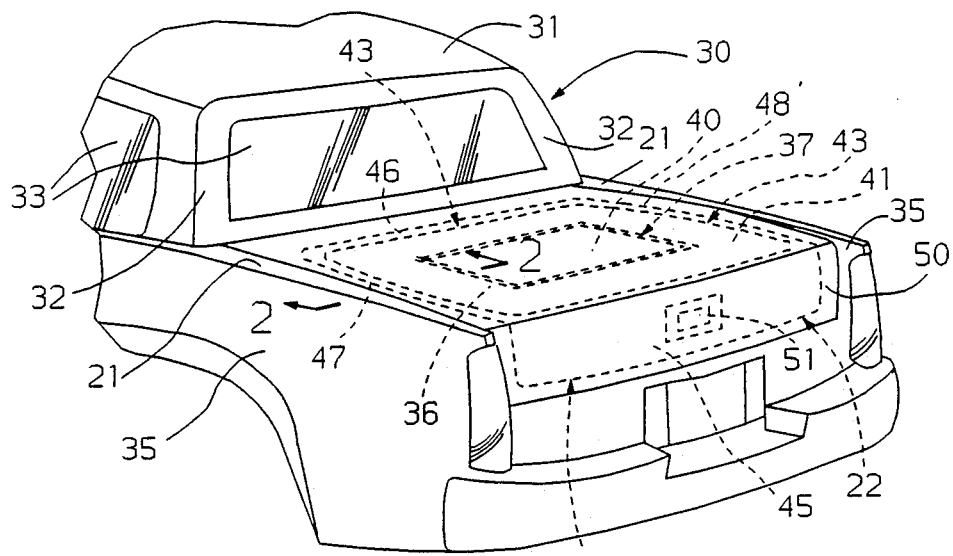
FIG. 1 shows a portion of a motor vehicle provided with an antenna according to this invention on its decklid.

Referring to FIG. 1, a motor vehicle 30 includes a horizontal roof 31 supported by substantially vertical roof pillars 32 separated by windows 33 on a lower body comprising lower body vertical panels such as fenders 35 and a horizontal rear decklid area 27, which includes an outer decklid panel 21 surrounding a deck or trunk opening 26 closed by an openable door such as decklid door 23. The various body panels described are made of an electrically conducting sheet metal such as steel except for door 23 of decklid area 27, which is made of an electrically insulating fiberglass or similar dielectric material. Generally, the roof area of the vehicle extends from one side of the vehicle to the other but stops short of each of the front and rear ends of the vehicle to allow lower horizontal hood and decklid areas. Generally, also, the roof is supported by vertical roof pillars at its four corners. The decklid area may be either at the front or the rear of the vehicle and the door may be the trunk door over a storage area or the hood over the engine compartment, although in the latter case it may be necessary to shield the antenna from RFI originating in the engine related equipment below.

An electrically conducting sheet 22 is provided for the underside of decklid door 23, either by painting or by attachment of a metal foil or similar 15 sheet as shown and described in U.S. Pat. No. 4,737,795, issued Apr. 12, 1988 to Nagy et al. The Conducting sheet 22 is divided by a looped antenna slot 37 into a central area 40 within slot 37 and an outer ground plane area 41 outside slot 37. Antenna slot 37 is shown as rectangular, although it may be circular or any other appropriate looped shape in the broadest sense of the invention. It has a width of about one quarter inch (6.44 mm) and a total circumferential or loop length of, for example, 128 inches 3.25 m, which is equivalent to a wavelength in the middle of the commercial FM broadcasting band of about 88.1 to 107.9 MHz. In the aforementioned U.S. Pat. No. 4,737,795, the ground plane area overlapped the sheet metal of the vehicle roof and was in electrical communication therewith at closely spaced points substantially around its entire periphery for FM grounding. The antenna of that patent, however, was a roof mounted antenna, in which the roof did not have to move relative to the rest of the vehicle.

Figure 2A:
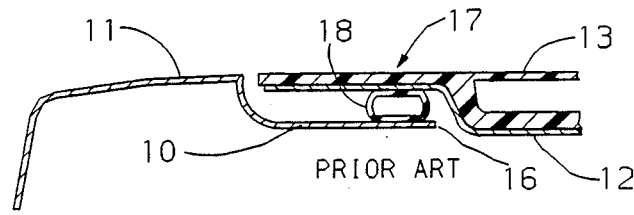
FIG. 2a is a section view, as would be seen along lines 2—2 in FIG. 1, of a decklid slot antenna with a prior art method of FM grounding.

An adaptation of the antenna of the aforementioned U.S. Pat. No. 4,737,795 to a vehicle decklid would produce an arrangement such as that shown in FIG. 2a, wherein decklid 17 comprises a layer 12 of electrically conducting material on the underside of non-conducting decklid door 13, and sheet 12 overlaps inwardly extending extension 10 of horizontal deck panel 11 defining trunk opening 16 of vehicle 30. Sheet 12 of decklid 17 and extension 10 would be vertically separated and electrically insulated by a rubber sealing gasket 18. The overlap, with a small separation when the decklid is closed, provides capacitive electrical communication for the grounding of the ground plane area at the periphery of layer 12 to horizontal deck panel 11 at frequencies in the commercial FM frequency band. Grounding at DC and at frequencies in the commercial AM broadcasting band of 535 to 1605 KHz would be be accomplished by a single ground connection such as with a ground wire or strap. Grounding in the commercial FM and cannot be accomplished with such a single ground wire but must be accomplished around a substantial portion of the antenna.

Figure 2B:
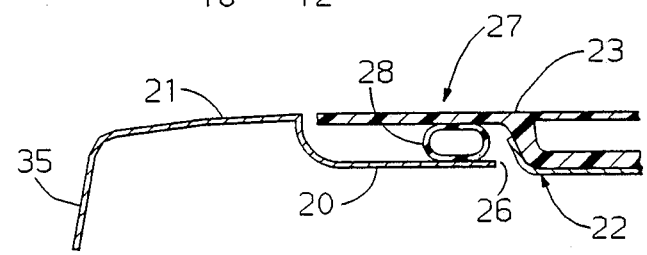
FIG. 2b is a section view along lines 2—2 in FIG. 1.

However, the designers of vehicle 30 may wish to keep the conducting layer 12 entirely within the trunk area of the vehicle, inside sealing gasket 18. Several reasons for this might be to protect it from the outside environment and to prevent wear as decklid is repeatedly opened and closed. Such an arrangement is shown in FIG. 2b, wherein decklid 27 comprises an electrically conducting sheet or sheet 22 under non-conducting decklid panel 23 which does not extend over sealing gasket 28: and it is apparent that there is no overlap of layer 22 with extension 20 of horizontal deck panel 21 for capacitive FM grounding as there is with the arrangement of FIG. 2a. Insulating sealing gasket 28 prevents direct electrical contact or significant capacitive coupling at commercial FM frequencies; and normal FM grounding as taught by the prior art is not obtained.

Therefore, a second, parasitic slot 43 is formed by the gap between the periphery of sheet 22 and the inner edge 26 of the conductive vehicle body which defines the trunk opening. Parasitic slot 43 is similar in shape to antenna slot 37: rectangular in this embodiment, with front side 46, left side 47 and right side 48 having a combined length substantially the same as the total circumference of slot 37. The widths of the front, left and right sides of slot 43 are between one quarter of an inch and one inch, with a smaller width preferred but with manufacturing considerations placing lower practical limits on the dimension. In any case, the width creates an equivalent impedance within the dielectric gap between sheet 22 and edge 26 of the conductive body sheet metal to couple the ground plane of the antenna slot across the for parasitic excitations by the antenna slot in the predetermined frequency range and thus act as a parasitic antenna to antenna slot 37.

Figure 3:
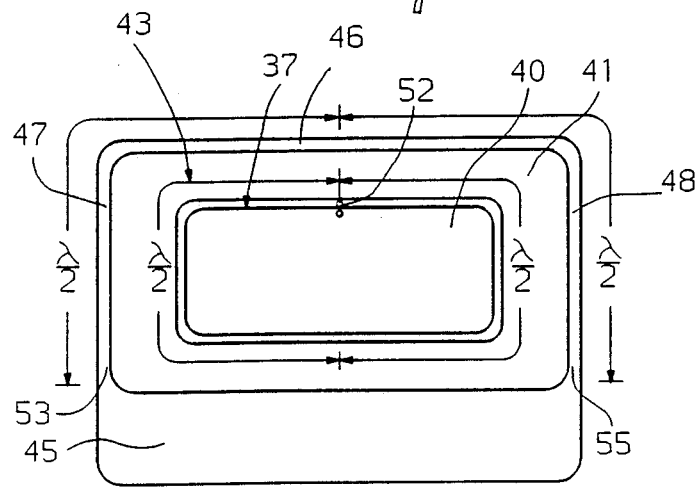
FIG. 3 shows the relative dimensions and shapes of the antenna slot and parasitic slot for the antenna of FIG. 1.

However, the back side 45 of slot 43 has a much greater width, typically at least several inches, which is sufficient to be an open circuit for currents flowing in the vicinity. The impedance of the antenna slot 37 is greatest at its feedpoint 52, which is shown at the front of the slot in FIG. 3, and at a point 180 degrees from feedpoint 52 around the slot. The parasitic slot has an essentially open circuit impedance at the two ends 53, 55 of the narrow slot This causes reflection of energy traveling along the parasitic slot and creates an effective parasitic slot length equal to that of the antenna slot for similar ground current patterns. Ground currents are thus generated outside the parasitic slot in the horizontal deck lid area of the electrically conducting vehicle body. Those ground currents flowing along the sides of the deck lid area are confined near the sides by the trunk opening and tend not to flow toward the back of the vehicle due to the infinite impedance of the wide second portion of the parasitic slot. This results in these currents being directed to the rear side vertical roof pillars; and a substantial portion of the currents flow upward through these vertical roof pillars to the vehicle roof. Thus, The length of the front, left and right sides 46–48 and the large width of the back side 45 provide current flows in the sheet metal of the vehicle similar to those produced by a properly FM grounded rectangular slot in the decklid, so that adequate vertical FM polarization is obtained in the antenna response, as desired.

Some vehicle decklid doors, such as door 27 shown in FIG. 1, have a vertical portion 50 at the rear. In the case of such a door, parasitic slot 43 may be so placed that the wide back portion 45 of slot 43 is on the vertical portion of the door. This will produce the additional benefit of increased horizontal radiation backwards from the vehicle in the antenna radiation pattern. Another helpful design technique is to place the wide back portion 45 of slot 43 so that it surrounds any electric motor latch or pull-down mechanism 51 of the decklid. Since back portion 45 is an open circuit area, this will prevent electrical interference in the antenna during operation of the electric decklid apparatus.

The embodiments of the invention in which an exclusive property or privilege is claimed are defined as follows:

1. A slot antenna for a motor vehicle having a generally electrically conducting body comprising a horizontal roof surface connected electrically to another horizontal body surface through vertical roof pillars, the other horizontal body surface having an opening therein, the vehicle further including a dielectric, openable door normally closing the opening and having on its underside an electrically conducting sheet neither in direct electrical contact with nor overlapping the other horizontal body surface around the opening, the slot antenna comprising, in combination:

a looped dielectric antenna slot in the sheet having a total circumference of about one wavelength in a predetermined frequency band, the antenna slot defining a ground plane in the sheet outside the slot and being fed at one point for signals in the predetermined frequency band; and a looped parasitic slot formed outside the antenna slot between the sheet and the other horizontal body surface, the parasitic slot comprising a first continuous portion with a length substantially the same as the total loop length of the antenna slot and a width effective to couple the ground plane of the antenna slot across a dielectric gap between the sheet of electrically conductive material and the electrically conducting vehicle body for parasitic excitations by the antenna slot in the predetermined frequency range and a second portion having a greater width effective to present an open circuit impedance to electric currents in the predetermined frequency range, whereby ground currents through the vertical roof pillars are generated by the antenna slot parasitically through the parasitic slot to enhance antenna performance, especially with regard to its vertically polarized radiation characteristics.

2. The slot antenna of claim 1 wherein the openable door includes a horizontal portion on which the antenna slot and the first portion of the parasitic slot are located and a vertical portion on which the second portion of the parasitic slot is located, whereby horizontal radiation from the second portion of the parasitic slot is enhanced.

3. The slot antenna of claim 2 wherein the antenna slot is generally rectangular and the parasitic slot is also generally rectangular with the first portion of the parasitic slot comprising three rectangular sides thereof and the second portion of the parasitic slot comprising the fourth rectangular side thereof.

4. The slot antenna of claim 3 wherein the vertical portion of the openable door with the fourth rectangular side of the parasitic slot is at an end of the vehicle opposite the roof portion, whereby horizontal radiation from the end of the vehicle is enhanced.

5. The slot antenna of claim 1 wherein the openable door includes an electrically operated latching mechanism located within the second portion of the parasitic slot to reduce electrical interference with antenna performance due to operation of the electrically operated latching mechanism.

6. The slot antenna of claim 1 wherein the openable door comprises a decklid serving as a door to a vehicle storage area covered by a horizontal deck area of the vehicle body.

7. The slot antenna of claim 6 wherein the antenna slot is generally rectangular and the parasitic slot is also generally rectangular with the first portion of the parasitic slot comprising three rectangular sides thereof and the second portion of the parasitic slot comprising the fourth rectangular side thereof.

8. The slot antenna of claim 1 in which the predetermined frequency band is the commercial FM broadcasting band of 88.1 to 107.9 MHz, the antenna slot has an effective length of substantially 3.25 meters and a width of substantially one quarter inch; and the first portion of the parasitic slot has a width between one quarter and one inch.

* * * * *